United States Patent
Joseph et al.

(10) Patent No.: US 7,631,314 B2
(45) Date of Patent: Dec. 8, 2009

(54) METHOD AND SYSTEM FOR DYNAMICALLY ASSOCIATING TYPE INFORMATION AND CREATING AND PROCESSING META-DATA IN A SERVICE ORIENTED ARCHITECTURE

(75) Inventors: Joshy Joseph, Poughkeepsie, NY (US); Thomas R. Maguire, Brewster, NY (US); Michael D. Willivam, Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 10/648,685

(22) Filed: Aug. 26, 2003

(65) Prior Publication Data

US 2005/0050549 A1  Mar. 3, 2005

(51) Int. Cl.
G06F 9/54 (2006.01)
G06F 17/30 (2006.01)

(52) U.S. Cl. ......................... 719/313; 707/10
(58) Field of Classification Search ............... 719/313; 707/10
See application file for complete search history.

(56) References Cited

U.S. PATENT DOCUMENTS

| | | | |
|---|---|---|---|
| 6,345,351 B1 * | 2/2002 | Holmberg | 711/203 |
| 7,055,143 B2 * | 5/2006 | Ringseth et al. | 717/143 |
| 7,065,706 B1 * | 6/2006 | Sankar | 715/234 |
| 2001/0049702 A1 | 12/2001 | Najmi | 707/513 |
| 2002/0157023 A1 * | 10/2002 | Callahan et al. | 713/201 |
| 2002/0174218 A1 * | 11/2002 | Dick et al. | 709/224 |
| 2003/0009572 A1 * | 1/2003 | Thurner | 709/230 |
| 2003/0014733 A1 * | 1/2003 | Ringseth et al. | 717/116 |
| 2003/0093551 A1 * | 5/2003 | Taylor et al. | 709/237 |
| 2003/0105825 A1 * | 6/2003 | Kring et al. | 709/206 |
| 2003/0233420 A1 * | 12/2003 | Stark et al. | 709/206 |
| 2006/0005175 A1 * | 1/2006 | Ringseth et al. | 717/143 |
| 2006/0155842 A1 * | 7/2006 | Yeung et al. | 709/224 |
| 2006/0265689 A1 * | 11/2006 | Kuznetsov et al. | 717/117 |
| 2006/0277458 A9 * | 12/2006 | Layman et al. | 715/513 |
| 2008/0162498 A1 * | 7/2008 | Omoigui | 707/10 |

OTHER PUBLICATIONS

James Clark , Nov. 16, 1999, W3C "XSL transformation (XSLT)".*
(Kenn Scribner; Marck C. Stiver ; 2002 by Sams Publishing; "Applied SOAP Implementing .NET XML Web Services"; Chapter 4; p. 124-137).*

* cited by examiner

*Primary Examiner*—Van H Nguyen
*Assistant Examiner*—Abdou K Seye
(74) *Attorney, Agent, or Firm*—Cantor Colburn LLP; William Kinnaman, Jr.

(57) ABSTRACT

A method for dynamically associating type information about extensible messages in a service-oriented architecture includes configuring a simple object access protocol (SOAP) message header to include message meta-data and semantics, thereby facilitating a dynamic exchange of semantic type information for open content message exchange between a sender and a receiver.

14 Claims, 3 Drawing Sheets

METHOD AND SYSTEM FOR DYNAMICALLY ASSOCIATING TYPE INFORMATION AND CREATING AND PROCESSING META-DATA IN A SERVICE ORIENTED ARCHITECTURE

BACKGROUND

The present invention relates generally to computer architecture systems and, more particularly, to a method and system for dynamically associating type information and creating and processing meta-data in a service oriented architecture.

Most service oriented computer network systems use Simple Object Access Protocol (SOAP) as an encoding mechanism, and therefore Extensible Markup Language (XML) as the underlying message format. Normally, messages transferred between the client and the service and both parties follow a message format known to both of them such that they can determine the message type and map it to their type system. This determination is typically based on static information such a well-known schema (e.g., published by standard bodies), some previous agreement on the schema (e.g., published by the service provider in a service description such as WSDL), or using a standard set of application programming interfaces. There are also other cases wherein the XML schema information and types are embedded with the message, and the framework knows how to interpret the message. Such characteristics are acceptable for most of the presently utilized message exchange patterns where both the parties are familiar with one other and the message(s) exchanged therebetween.

On the other hand, it is also desirable to be able to support a message exchange pattern wherein both client and server are flexible such that messages may be sent without being bound to a previous agreement on the schema. Although "open-content" XML schemas are available by using the XML "any" type definition extension, there is still a semantic problem (i.e., meaning and use of the data) associated with flexible, open-content message data. This problem is driven by the static nature of the data and "a priori" agreements between both parties in the exchange pattern. Accordingly, it would be advantageous to be able to exchange semantic type information dynamically along with the message, but without disturbing the exchange pattern.

SUMMARY

The foregoing discussed drawbacks and deficiencies of the prior art are overcome or alleviated by a method for dynamically associating type information about extensible messages in a service-oriented architecture. In an exemplary embodiment, the method includes configuring a simple object access protocol (SOAP) message header to include message metadata and semantics, thereby facilitating a dynamic exchange of semantic and meta-data information for open content message exchange between a sender and a receiver.

In another aspect, a system for dynamically associating type information about extensible messages in a service-oriented architecture includes a simple object access protocol (SOAP) message header configured to include message metadata and semantics, thereby facilitating a dynamic exchange of semantic and meta-data information for open content message exchange between a sender and a receiver.

In another aspect, a method for synthesizing and processing dynamically associated meta-data associated with extensible markup language (XML) messages in service-oriented computer architecture includes generating message metadata within the header of a simple object access protocol (SOAP) message. The SOAP message is received, and semantic information and the meta-data from the SOAP header are retrieved. The semantic information and the meta-data are associated during processing of the body of the SOAP message.

In yet another aspect, a system for synthesizing and processing dynamically associated meta-data associated with extensible markup language (XML) messages in service-oriented computer architecture includes a send side framework for generating message meta-data within the header of a simple object access protocol (SOAP) message. A receive side framework receives the SOAP message and processes the semantics in the SOAP header, the receive side framework further configured for retrieving semantic information and the meta-data from the SOAP header, and associating the semantic information and meta-data during processing of the body of the SOAP message.

BRIEF DESCRIPTION OF THE DRAWINGS

Referring to the exemplary drawings wherein like elements are numbered alike in the several Figures.

DETAILED DESCRIPTION

Disclosed herein is a system and method for dynamically associating type information (e.g., message schema type, location, message description and/or other details including native object type mapping information, etc.) about extensible messages in a service-oriented architecture. Briefly stated, a SOAP header is configured so as to carry the message semantics, thereby allowing both parties to exchange the semantic type information dynamically along with the message without disturbing the message exchange pattern. The header information may include a schema of the 'any' type message, RDF description of the message and/or object system types, or other information that can help the target to understand the data.

In addition, there is further disclosed a framework to synthesize and process the dynamically associated meta-data (e.g., message schema type, location, message description and/or other semantic details including native object type mapping information, etc.) associated with extensible messages in service-oriented architecture. A send-side (message producer) framework is used to support passing type and other meta-data about the message extensions using SOAP headers, while a receive-side (message consumer) framework processes the semantics in the SOAP header, generates the corresponding semantic/meta-data processors and associates the same with the SOAP and/or XML processors. Furthermore, meta-data processors work, in conjunction with the SOAP and/or XML processors, to validate and map the extensible XML messages to the native object systems and/or native semantic processors.

Figure 1A:
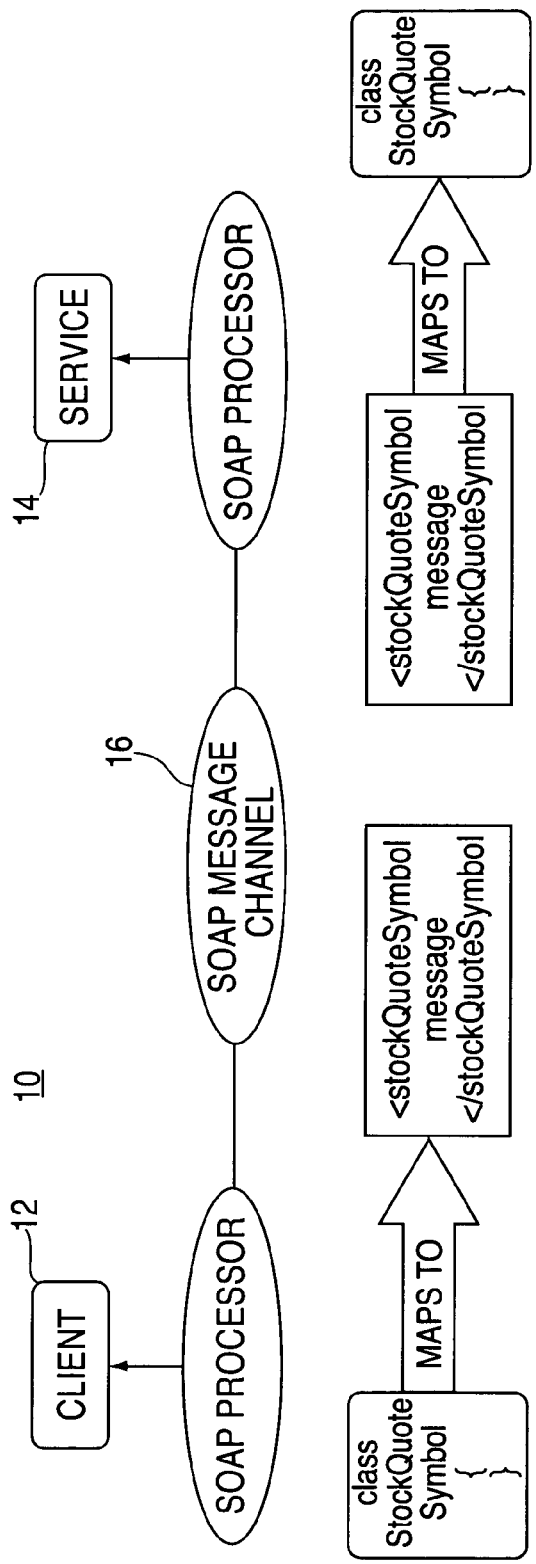
FIG. 1(a) is a schematic block diagram illustrating an existing SOAP message exchange pattern between a client and a service in a service-oriented architecture, wherein the data types are known by both client and service.
Figure 1B:
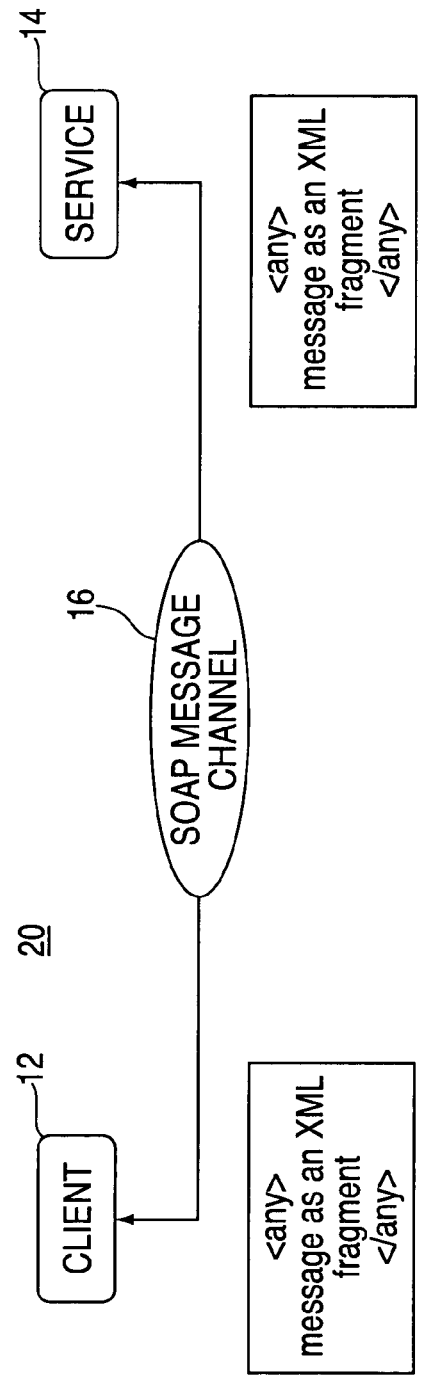
FIG. 1(b) is a schematic block diagram illustrating an existing flexible SOAP message exchange pattern between a client and a service in a service-oriented architecture, wherein no data types are associated with the message.

As stated previously, in a service oriented architecture, messages (i.e., XML messages) are typically exchanged between the client and the service over a Simple Object Access Protocol (SOAP). FIG. 1(a) is a schematic block diagram illustrating an existing SOAP message exchange pattern 10 between a client 12 and a service 14 over a SOAP message channel 16 in a service-oriented architecture. In the example illustrated, the data types (stockQuoteSymbol) are known by both client and service, and thus no type is associated with the message as shown by the XML mapping. In contrast, FIG. 1(b) illustrates a flexible SOAP message exchange pattern 20 between client 14 and service 16 in a service-oriented architecture, wherein no data types are associated with the message.

Thus, some of these SOAP messages are flexible and extensible in nature. Normally, these messages are described using a XML schema for XML message type validation and conformance to the schema type system. In particular, a conventional framework supports a XML message extension scheme using the schema language 'any' construct (using xsd:any (for elements) and xsd:anyAttribute (for attributes) with xsd:##any for any namespace). This typeless data type construct provides the maximum flexibility to a message description by allowing an open content model, and also allows a message to contain any well-formed XML from any namespace. Unfortunately, this flexibility imposes a number of restrictions on the existing message processing frameworks.

There are a number of conventional approaches that have been implemented to deal with and validate this kind of extensible but un-typed message format (open-content model) using the 'any' type. One way is for the SOAP processors to simply ignore untyped messages and assemble them as a XML fragment, thus and leaving it to the service to handle the semantics. However, the service needs prior knowledge of the message in order to properly process and parse the message. Another approach is for a SOAP processor to utilize a type-mapping system to map a native object to an XML fragment, provided that this mapping is defined earlier. This approach is very much static in nature, since both parties know about the types. Still another approach is for the service and SOAP processors to use well-known schema information to map the XML fragment to the known schema and attempt to validate it. However, this may not work in all instances. Alternatively, a message body may be wrapped with some type information and passed to the processor. Although this approach lets the processor know about the details of how to interpret the type and semantics of the message, it is specific to the encoding of the message and thus not flexible for an open content model.

Therefore, in accordance with an embodiment of the invention, there is disclosed a dynamic and flexible method for providing the message type information for any extensible message fragments without changing the message format and without imposing any "a priori" knowledge on the message. A mechanism is defined to enhance the existing message exchange pattern by allowing the parties in the conversation to send runtime semantics (e.g., message schema type, description and other semantic information including type information) along with the messages rather than relying on the static information on the messages. This dynamic message type association, along with the support of an open-content model of the message, helps to define flexible and extensible message exchange pattern in a service-oriented architecture.

Figure 2:
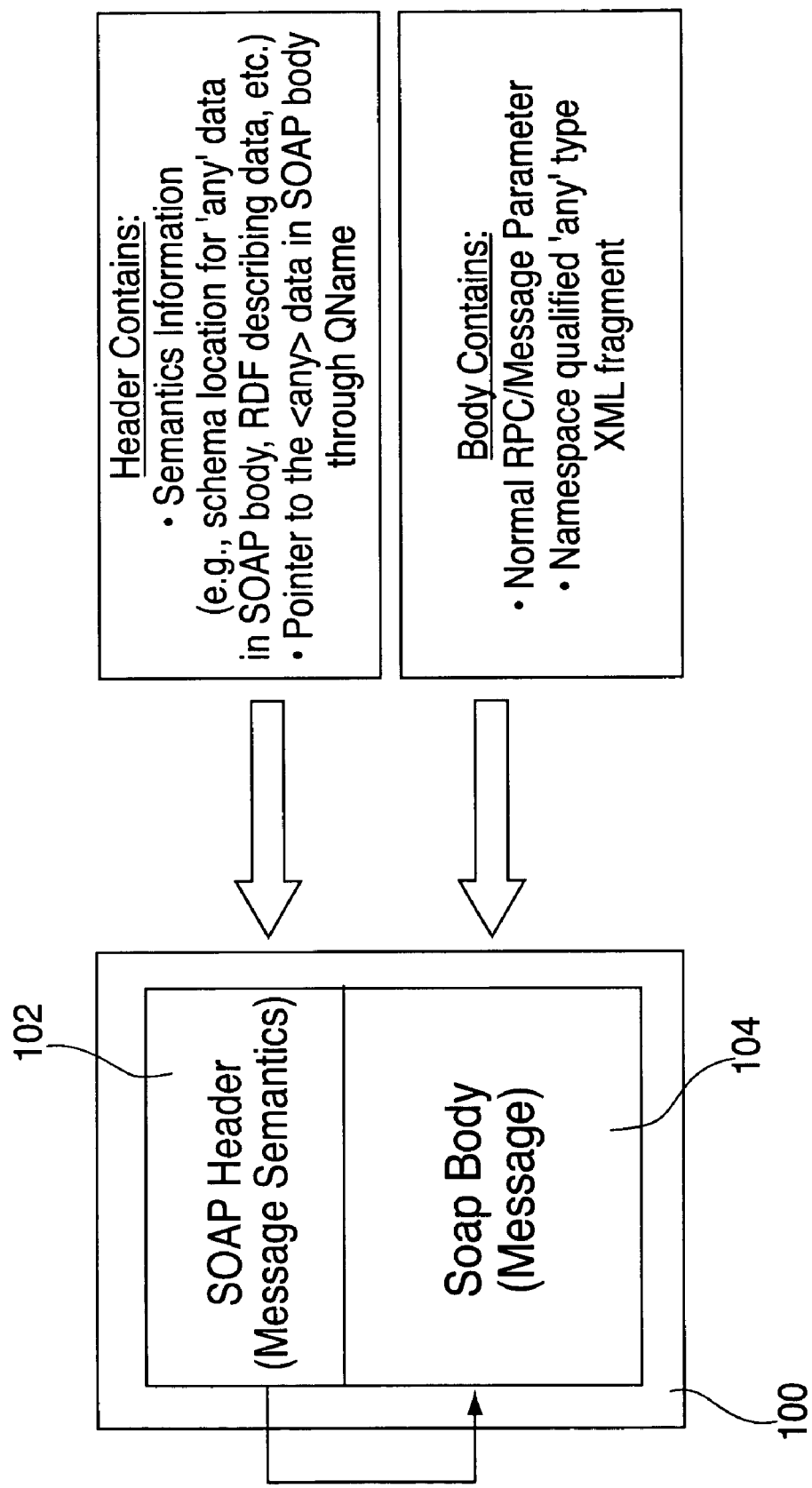
FIG. 2 is a block diagram illustrating a SOAP message wherein the header thereof includes message semantics for a flexible XML schema, in accordance with an embodiment of the invention.

Accordingly, FIG. 2 is a block diagram illustrating a SOAP message 100 including a message header 102 and message body 104, wherein the header 102 includes message semantics information for a flexible XML schema, such as the 'any' data type. The header 102 also preferably contains a pointer to the <any> data that is carried within message body 104. The message body 104, in turn, includes the normal remote procedure call (RPC) and message parameters, as well as a namespace-qualified 'any' type XML fragment. As such, the present invention embodiments support a message exchange pattern where both client and server have the flexibility to send messages without being bound to a previous agreement, but that also overcomes the type safety and rigidity associated with an open content model.

An example of a SOAP message having the semantic information included in the message header is presented as follows:

EXAMPLE

XML Schema Definition

This is a flexible schema for subscribing to a news information service, wherein any information needed for the subscription information can be passed based on the particular need. Therefore, the schema is defined to be flexible with <xsd:any> element information.

```
<xsd:ComplexType name=" SubscribeToNewsInformation">
  <sequence>
    <element name=" subscription Info" type="subscriptionInfoType "/>
  </sequence>
</xsd:ComplexType>
<xsd:ComplexType name=" subscription InfoType">
  <xsd:sequence>
    <xsd:any namespace="##any"/>
  </xsd:sequence>
</xsd:ComplexType>
```

SOAP Message

As described above, the schema is flexible and open ended. Thus, the client can submit desired subscription information to the server. In addition, the client can add type information (e.g., the schema type of the message or a native object type mapping information) about the subscription message through the SOAP header. Moreover, the server side processor can infer the type of the message by looking into the header and use that information to process the message. Simple type information can be a schema location about the message, or a java class to handle the message, for example.

```
<?xML version="1.0" encoding="UTF-8"?>
<s: Envelope
    xmlns:s=http://schemas.xmlsoap.org/soap/envelope/xmlns:xsd="
    http://www.w3.org/2001/XMLSchema"
xmlns:xsi="
    http://www.w3.org/2001/XMLschema-instance">
<s: Header>
    <m:anyTypeSemantic
      xmlns:m =" http://www.ibm.com/2002/AnyProcessor"
      <m :anyTypePointer m reference=" urn:ibm..any.local.1">
        <m:schemaLocation
```

-continued

```
            value ="http://www.ibm.com/grid/mySchema.xsd" />
        </m:anyTypePointer>
        <m:anyTypePointer m: reference=" urn:ibm..any.local.2">
            <rdf:RDF
            xmlns:rdf=http//www.w3c.org/199/02/22-rdf-syntax-ns#>
            </rdf: RDF>
        </m:anyTypePointer>
    </m :anyTypeSemantic>
</s:Header>
<s: Body>
    <subscribeToNews xmlns=" http://ibm.com/test/subscribe ">
        <ns1: subscribeToNewsInformation
                xmlns: ns1 =" http://ibm.com/test/types">
            <ns1:subscription Info>
            <ns4:any
                xmlns:ns4="urn:ibm..any.local.1">
                <ns5:address xmlns:ns5="http://ibm .addrbook">
                    <name>Joshy </name>
                    <street> Cherry Hill</street>
                    <zip> 12603</zip>
                </ns5 :address>
            </ns4:any>
        </ns1:subscriptionExpression>
        </ns1:subscribeToNews Information>
    </subscribeToNews>
</s:Body>
</s:Envelope>
```

As illustrated in the exemplary SOAP message, the message semantics are passed along with the message but without changing the message by including the semantics in the header. This provides the ability to send an 'any' message and extend an 'any' message, wherein the message exchange pattern and the type of the message does not affect either the sender or receiver side of the service framework. Advantageously, there is no need for any prior agreement on extensible message types and service providers can define an open-content model XML message format wherein dynamic message semantics are exchanged for each message. The message types may be associated to a message exchange pattern at runtime, while programming hooks and policies can implement this association.

In conjunction with the above-described method for dynamically associating meta-data information about the XML message in a service-oriented architecture, a framework is also disclosed that can incorporate this semantic processing model with an XML and SOAP processor. More specifically, this disclosure provides a message producer and consumer framework to pass and interpret the meta-data about the message extensions defined at runtime. This framework is built on the SOAP message exchange pattern, and uses a SOAP header framework for meta-data information exchange.

Figure 3:
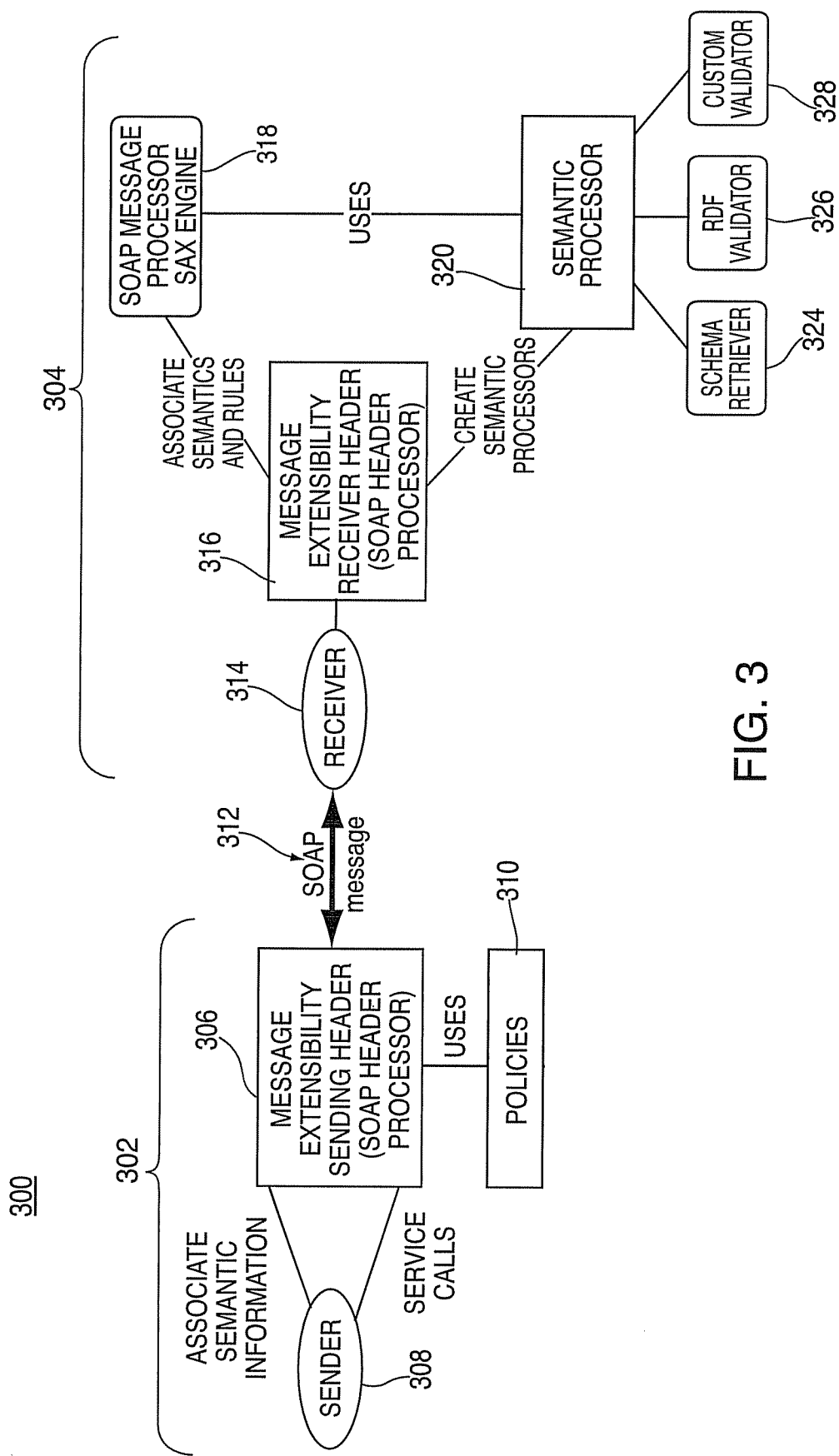
FIG. 3 is a block diagram illustrating a framework for synthesizing and processing dynamically associated meta-data associated with extensible messages in service-oriented architecture, in accordance with a further aspect of the invention.

FIG. 3 is a block diagram illustrating a framework 300 for synthesizing and processing dynamically associated meta-data (e.g., message schema type, location, message description and/or other semantic details including native object type mapping information, etc.) associated with extensible messages in service-oriented architecture, in accordance with a further aspect of the invention. Generally, the framework 300 includes a send-side (message producer) framework 302 to support passing meta-data information regarding the message extensions using SOAP message headers (as discussed above), and a receive-side (message consumer) framework 304 to process the semantics in the SOAP header and associate it with the SOAP and/or XML processor.

The send-side framework 302 includes a send-side SOAP handler 306 that is used to create the message meta-data about the message extension element. Again, the handler 306 uses SOAP headers as a placeholder for message meta-data, including Uniform Resource Identifier (URI) references to the SOAP body elements for which the semantics can be applied. A sender 308 may associate the meta-data during the runtime through runtime type and meta-data association about extended XML messages, using application programming interfaces (API). In other words, the message producers can use API to register runtime message type and other meta-data information about the extensible XML message with a SOAP message header, but without changing the existing SOAP message exchange pattern.

In addition, the meta-data may be associated based on policies defined for extensible XML messages in the message exchange pattern. That is, the send-side SOAP handler 306 can associate certain policies 310 with the message extension framework, wherein the framework (at runtime) can embed the meta-data with the SOAP header based on the policy defined for the extensible XML message.

Once a SOAP message 312 is received, a receiver 314 may process the SOAP message 312 (containing the meta-data about the extensible message) and retrieve the semantic information from the SOAP header with a receive-side SOAP handler 316. Thereafter, the receive-side handler 316 associates the semantic information with a SOAP processor 318 and/or an XML (semantic) processor 320 at the time of the SOAP message body processing. This flexibility allows the runtime system to attach any meta-data information processor with the extensible XML message processor.

The receiver 314 may process the meta-data information using one or more framework models. First, the server-side SOAP message processing handler 306 can retrieve the SOAP header information, create the necessary meta-data processors, and associate that with the SOAP message body processors 318 and/or XML processors 320 (simple API for XML (SAX) parser). This flexible framework will enable the SOAP engine to create meta-data processors based on the meta-data information in the SOAP header and associate that with the runtime system. For example, a processor that works with the current SOAP XML message parser can also load the XML schema needed to process the extended XML message from a URI location as specified in the SOAP header.

Second, the SOAP header XML data processor 320 can be used to directly process the header information. During the processing of the SOAP header XML fragments, the receive side handler 316 can create necessary meta-data processors 320 and associate that with the SOAP message body processors and/or XML processors (SAX parser). This flexible framework will enable the SOAP engine to create meta-data processors based on the meta-data information in the SOAP header and associate that with the runtime system.

Third, the SOAP message processor 318, on parsing, may generate warning messages upon encountering XML elements or attributes that are not specified by the XML schema. These are extended XML messages. The runtime system can then use the meta-data from the SOAP header to process the XML message. For example, the XML processor can load the XML schema for the extensible message and attach that to the schema processor.

Finally, framework 300 includes one or more meta-data processors working in conjunction with the SOAP and XML processors 318, 320 to validate and map the extensible XML messages. More specifically, a set of pluggable meta-data processors (denoted generally at 322) are defined to process the meta-data information associated with a message. For example, a schema generator processor 324 is based on the XML schemaLocation attribute and namespace information associated with an extended XML message. These schema generators can work with the object type system to generate corresponding native objects. Also, an RDF processor 326 is used to understand the semantic of the extensible message, while native processors 328 manage the type system and type mapping information.

As will be appreciated, advantages of the above described framework architecture include the dynamic association of message type and meta-data for an extensible message, as well as the flexibility in the processing of dynamic meta-data in a service oriented architecture. In addition, compatible extensions are provided to existing SOAP based message exchange patterns, thereby enabling service providers to define an open-content model XML message format and provide the service clients the capability to dynamically associate the meta-data for the content and be able to process that content data based on the meta-data associated with data.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for dynamically associating type information about extensible messages in a service-oriented architecture, the method comprising:

configuring a simple object access protocol (SOAP) message header associated with a SOAP message body to include message meta-data and semantic type information describing at least a portion of the content of the SOAP message body so as to enable a receiver to interpret and process the content of the SOAP message body using the meta-data and semantic type information included in the SOAP message header, thereby facilitating a dynamic exchange of semantic type information and meta-data information for open content message exchange between a sender and the receiver, wherein the dynamic exchange of semantic type information and meta-data information for open content message exchange between the sender and the receiver is implemented without changing message format of the message body.

2. The method of claim 1, wherein said SOAP message header includes an extensible markup language (XML) schema for an XML <any> type message.

3. The method of claim 2, wherein said SOAP message header further includes at least one object system type.

4. The method of claim 2, wherein said SOAP message header further includes a resource description framework (RDF) description of the message.

5. The method of claim 2, wherein said SOAP message header further includes a reference to <any> data included within the body of the SOAP message.

6. A system including at least one processor for synthesizing and processing dynamically associated meta-data associated with extensible markup language (XML) messages in service-oriented computer architecture, comprising:

a send side framework for generating message meta-data within a header of a simple object access protocol (SOAP) message having a SOAP message body, comprising a send side header processor configured to create said meta data, said meta data describing at least a portion of the content of said SOAP message body so as to enable a receiver to interpret and process the content of the SOAP message body using the meta-data and semantics included in the SOAP message header; and a receive side framework for receiving said SOAP message and processing the semantics in the SOAP header, comprising a receive side SOAP header processor and at least one meta-data processor for processing said meta-data, said at least one meta-data processor being implemented with at least one of a SOAP processor and an XML processor;

said receive side framework further configured for retrieving semantic information and said meta-data from the SOAP header, and associating said semantic information and said meta-data during processing of the body of said SOAP message, wherein said semantic information and said meta-data is used to interpret the content of the SOAP message body, and wherein said at least one meta-data processor and said at least one of a SOAP processor and an XML processor are configured to validate and map the extensible XML messages;

wherein a dynamic exchange of semantic type information and meta-data information for open content message exchange between the sender and the receiver is implemented without changing message format of the message body.

7. The system of claim 6, wherein said at least one meta-data processor is implemented with at least one of:

a schema generator processor, said schema generator processor based on an XML schemaLocation attribute and namespace information associated with an extended XML message;

a resource description framework (RDF) processor for interpreting said semantic information; and at least one native processor for managing type system and type mapping information.

8. The system of claim 6, wherein said send side framework further comprises a sender for associating the meta-data at runtime using application programming (API) interfaces.

9. The system of claim 6, wherein said send side framework further comprises a sender for associating the meta-data at runtime, said sender using a defined message extension policy for an XML message.

10. The system of claim 6, wherein said retrieving semantic information from the SOAP header further comprises implementing a server side SOAP handler to create one or more meta-data processors.

11. The system of claim 6, wherein said retrieving semantic information from the SOAP header further comprises implementing a SOAP engine to create one or more meta-data processors, based upon the meta-data contained within the SOAP header.

12. The system of claim 6, wherein said receive side framework further comprises an associating XML processor.

13. The system of claim 10, wherein said one or more meta-data processors created by said server side SOAP handler is configured to load an associated XML schema from a uniform resource identifier (URI) location specified in the SOAP header.

14. The system of claim 12, wherein said associating XML processor generates warning messages upon encountering at least one of XML elements and XML attributes that are unspecified by the XML schema.

* * * * *

UNITED STATES PATENT AND TRADEMARK OFFICE
CERTIFICATE OF CORRECTION

PATENT NO. : 7,631,314 B2
APPLICATION NO. : 10/648685
DATED : December 8, 2009
INVENTOR(S) : Joseph et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 942 days.

Signed and Sealed this

Second Day of November, 2010

David J. Kappos
*Director of the United States Patent and Trademark Office*